United States Patent [19]

Sano

[11] 4,414,170
[45] Nov. 8, 1983

[54] METHOD OF PRODUCING VENTILATOR GRILLS

[75] Inventor: Yoshiaki Sano, Fuji, Japan

[73] Assignees: Nihon Plast Co., Ltd., Fuji; Yamato Plastics Machinery Co., Ltd., Tokyo, both of Japan

[21] Appl. No.: 365,918

[22] Filed: Apr. 6, 1982

[51] Int. Cl.³ .............................. B29D 3/00; B29F 1/00
[52] U.S. Cl. ................................ 264/242; 98/121 R; 264/250
[58] Field of Search .............. 98/121 R; 264/242, 250

[56] References Cited

U.S. PATENT DOCUMENTS

| 2,931,066 | 4/1960 | Goettl | 264/242 |
| 3,301,164 | 1/1967 | Eberhart | 98/121 R |
| 3,756,138 | 9/1973 | Box | 98/121 R |
| 3,785,217 | 1/1974 | Peura | 264/242 |
| 3,828,406 | 8/1974 | Hannes | 264/242 |
| 3,978,189 | 8/1976 | Einhorn | 264/242 |
| 4,060,024 | 11/1977 | Deck | 98/121 A |

FOREIGN PATENT DOCUMENTS 53-19372 2/1978 Japan .
54-26266 9/1979 Japan .
56-6913881 6/1981 Japan .
1554635 10/1979 United Kingdom .

Primary Examiner—Willard E. Hoag
Attorney, Agent, or Firm—Armstrong, Nikaido, Marmelstein & Kubovcik

[57] ABSTRACT

A method of producing a ventilator grill (A) comprising a grill frame (B) and louver vanes (E) pivotally mounted thereon utilizes first, second and third mould halves. After the first and second mould halves have been used in a first position to make the grill frame (B) formed of a first plastics material and having axle holes (C) and recesses (D) formed therein by cores, the first mould half and the cores are removed from the second mould half and from the grill frame (B) retained thereon and then the second mould half with the grill frame (B) thereon is moved to a second position to which the third mould half is moved into close contacting relationship to the second mould half and the grill frame (B) to cooperate with them to define a vane moulding cavity into which a second plastics material is injected to form the louver vanes (E) having integral axles (F) and disc-like friction portions (G) formed by the second plastics material solidified in the axle holes (C) and the recesses (D) in the grill frame (B).

2 Claims, 7 Drawing Figures

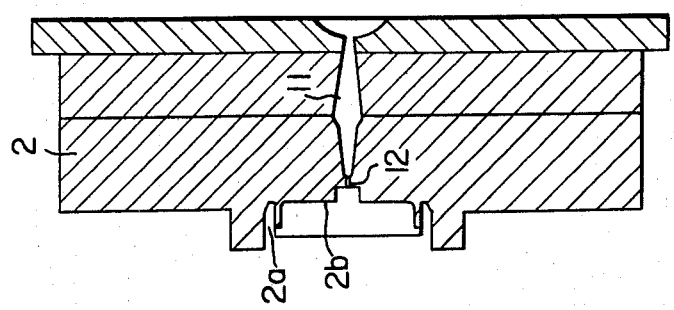
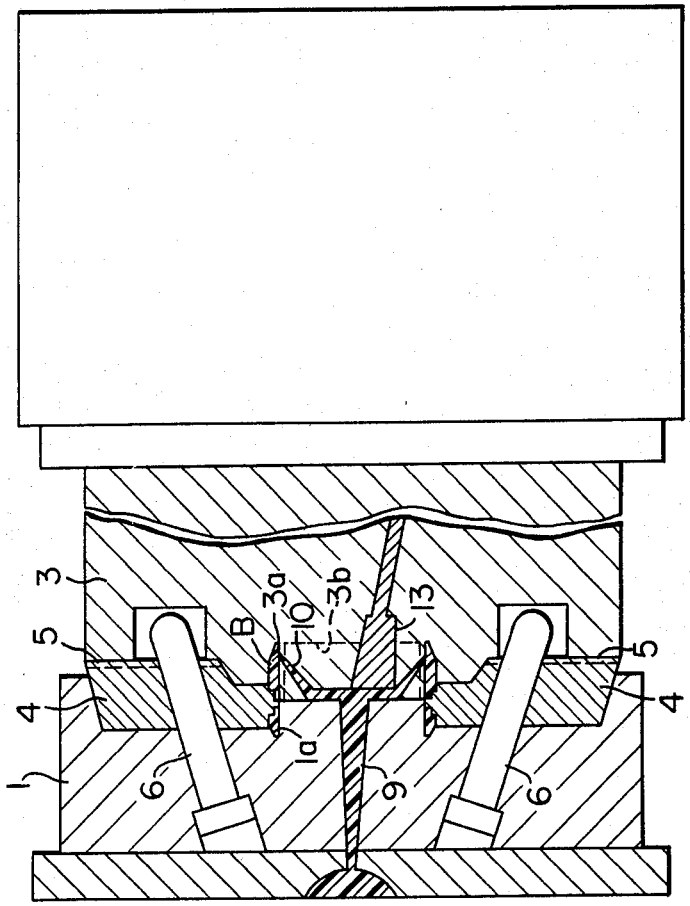
FIG. 4

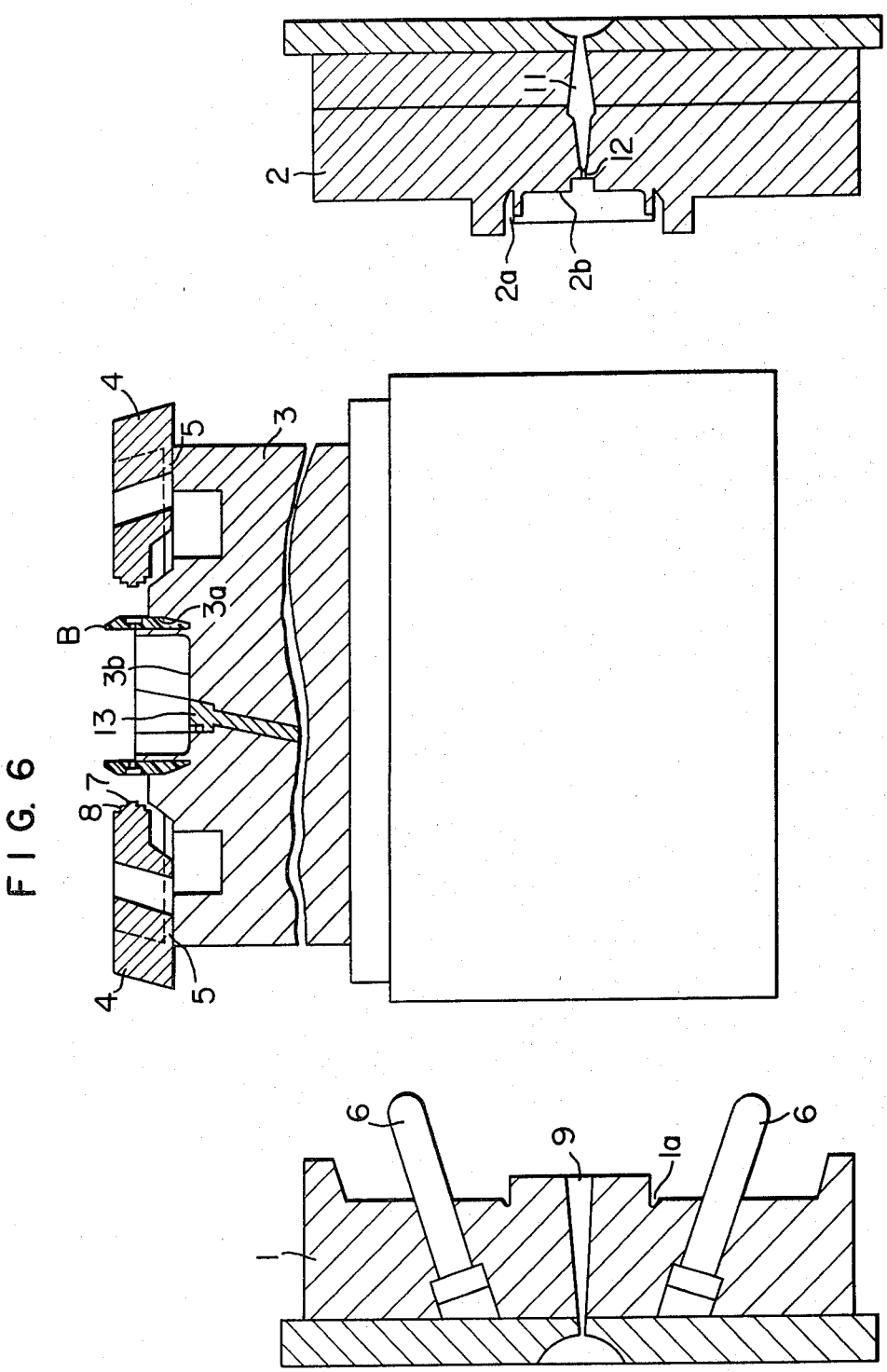

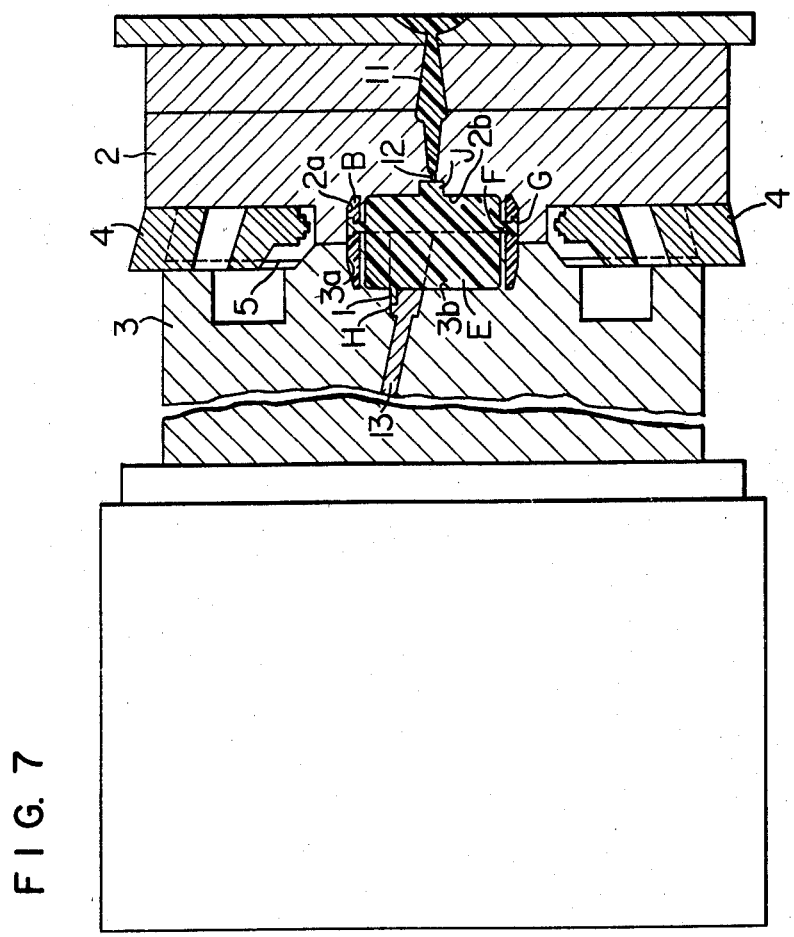
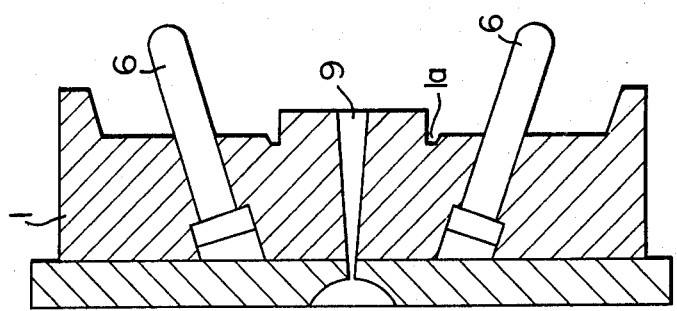
FIG. 7

METHOD OF PRODUCING VENTILATOR GRILLS

BACKGROUND OF THE INVENTION

1. Field of the Invention

The present invention relates to a method of producing ventilator grills for use in ventilation systems such as automotive air conditioners. More particularly, the invention is concerned with a method of producing a ventilator grill of the type which comprises a grill frame and substantially parallel louver vanes pivotally mounted on the grill frame, the grill frame including a pair of opposite sides in which aligned pairs of axle holes are formed, the louver vanes having axles extending from the opposite ends of the vanes respectively and rotatably received in respective aligned pairs of axle holes, the grill frame being provided with at least two recesses formed in the outer surfaces of the pair of opposite sides of the frame and communicated with one of the aligned pairs of axle holes, the louver vane associated with the one aligned pair of axle holes having disc-like friction portions integrally connected to the outer ends of the axles of the one vane and received in the recesses rotatably but frictionally to provide a slight frictional resistance to angular movements of the louver vane relative to the grill frame.

2. Description of the Prior Art

The specification of Japanese Pat. No. 990,864 (Post-Examination Patent Publication No. 54-26,266 published Sept. 3, 1979) discloses a method of producing a ventilator grill of the class specified above. According to the method disclosed in the Japanese patent specification referred to above, a prefabricated grill frame of a first plastics material is inserted into a louver forming mould. Then, a second plastics material having a melting point different from that of the first plastics material is injected into the louver forming mould to form a louver. The prefabricated grill frame is provided with axle holes formed in the two opposite sides of the grill frame. Circular recesses are formed in the outer surfaces of these opposite sides of the grill frame and communicated with the axle holes. Thus, the second plastics material injected into the louver forming mould fills up the louver vane moulding spaces and also the axle holes and recesses in the prefabricated grill frame to form louver vanes having axles extending from the opposite ends of the vanes and circular friction portions integral with the outer ends of the axles. When the second plastics material is cooled and solidified, the material slightly shrinks radially inwardly within the axle holes so that the second plastics material solidified in the axle holes is slightly spaced from the inner surface of the axle holes to allow louver vanes to be rotated relative to the grill frame. The shrinkage also takes place in the axial direction of the axle holes to slightly inwardly bias the disc-like friction portions against the bottoms of the recesses. The friction portions, therefore, cooperate with the grill frame to produce a slight frictional resistance to the angular movement or rotation of the louver vanes relative to the grill frame.

The ventilator grill producing method disclosed in the above-mentioned Japanese patent publication eliminates conventionally required complicated steps of fabricating the grill frame and the louver vanes separately and then assemblying the grill frame and the louver vanes so that the vanes are rotatable with respect to the frame. Thus, the prior art method not only greatly improves the productivity but also assures the production of ventilator grills which are operative to reliably control the direction of the flow of air through the grill because the friction between the disc-like friction portions of the vanes and the grill frame is sufficient to hold the vanes at any desired angular orientation. However, the prior art method discussed above inevitably includes the step of inserting a prefabricated grill frame into a louver forming mould and thus falls short of satisfying the demand for an improved continuous production of individual ventilator grills.

Japanese Pre-Examination Patent Publication No. 53-19372 published Feb. 22, 1978 discloses another method of producing a ventilator similar in type to the ventilator grills manufactured by the method disclosed in the Japanese patent specification referred to above. In the other ventilator producing method, one mould is used which defines therein cavities for moulding a grill frame and for moulding louver vanes. A first plastics material is injected by a first injection cylinder into a first or grill frame moulding cavity to form a grill frame having axle holes and coaxial recesses formed therein. For this purpose, the mould is provided with a plurality of sets of complicated plungers each comprising a pair of telescopic plungers one of which is an outer tubular or sleeve-like plunger and the other of which is a rod-like plunger slidably received in the outer sleeve-like plunger for relative axial movement. When the first plastics material is injected into the grill frame moulding cavity, the outer and inner plungers are extended into the grill frame moulding cavity to their innermost or most extended position in which the inner rod-like plunger projects a distance from the outer sleeve-like plunger so that the inner and outer plungers act as cores for moulding the axle holes and coaxial recesses in the grill frame thus moulded. After the first plastics material has been solidified in the cavity, the inner and outer plungers are retracted to their outermost or most-retracted position in which the end faces of the inner and outer plungers are flush with each other and also with the outer surfaces of the sides of the grill frame in which the axle holes and recesses have been formed. Then, a second plastics material having a melting point lower than that of the first plastics material is injected by a second injection cylinder into the louver vane moulding cavity and into the axle holes and recesses formed in the grill frame.

The second method needs a complicated mould because two plastic inlet ports for connection with two injection nozzles for the first and second plastics materials must be formed in one mould. In addition, the method calls for the use of a plurality of sets of complicated cylinders each comprising a pair of telescopic outer or sleeve-like plunger and an inner rod-like plunger for moulding the axle holes and the coaxial recesses in the grill frame.

SUMMARY OF THE INVENTION

It is an object of the present invention to add an improvement to the ventilator grill producing method disclosed in the first-mentioned Japanese patent specification to make it possible to continuously carry out the respective steps of the method.

According to the present invention, there is provided a method of producing ventilator grills of the type specified above, the method comprising the steps of:

gathering together first and second mould halves and cores in a first predetermined position in which they cooperate to define a first mould cavity for moulding a grill frame, said cores defining surfaces for moulding axle holes and recesses in the grill frame;

injecting a first plastics material into said first mould cavity;

allowing said first plastics material to solidify in said first mould cavity to form said grill frame having said axle holes and recesses;

removing said grill frame from said first mould half and from said cores while said grill frame is retained on said second mould half;

gathering together said second mould half with said grill frame thereon and a third mould half in second predetermined position in which the part of said grill frame moulded by said first mould half is received in said third mould half and in which said second and third mould halves and said grill frame cooperate together to define a second mould cavity for moulding louver vanes, said second mould cavity including spaces for moulding axles and friction portions of said louver vanes, said spaces being defined by said axle holes and recesses formed in said grill frame;

injecting into said second mould cavity a second plastics material which is not weldable to said first plastics material and has a melting point lower than that of said first plastics material; and allowing said second plastics material to solidify in said second mould cavity to form said vanes, said axles and friction portions of said vanes being shrunk when solidified in said axle holes and recesses to allow said vanes to be angularly movable relative to said grill frame.

In a preferred embodiment of the invention, the second mould half is supported for angular movement about an axis between said first and second predetermined positions. When the second mould half is placed in the first position, the first mould half and the cores may be moved to the first position into close contacting relationship to the second mould half to cooperate therewith to define the first mould cavity and, when the second mould half with the grill frame thereon has been angularly moved to the second predetermined position, the third mould half may then be moved to the second position into close contacting relationship to the second mould half and the grill frame thereon to cooperate with them to define the second mould cavity.

It is another object of the present invention to provide a ventilator grill produced by the method discussed above.

The above and other objects, features and advantages of the present invention will be made apparent by the following description with reference to the accompanying drawings.

BRIEF DESCRIPTION OF THE DRAWINGS

FIG. 4 is an enlarged partially sectional view of the moulding machine showing one step of the method of the invention;

FIG. 6 is another enlarged partially sectional view of the moulding machine in a different position; and FIG. 7 is a still another enlarged view of the moulding machine in another position.

DESCRIPTION OF A PREFERRED EMBODIMENT

Figure 1:
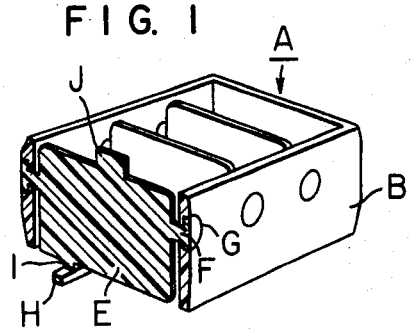
FIG. 1 is a perspective view of a ventilator grill produced by the method of the present invention, with a part of the ventilator grill being cut away to show axles and friction portions of a louver vane.
Figure 2:
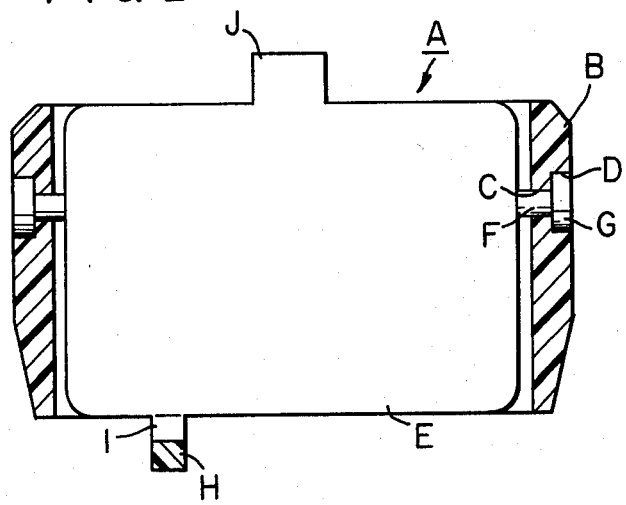
FIG. 2 is an enlarged partly sectional view of the ventilator grill shown in FIG. 1.

Referring first to FIGS. 1 and 2, a ventilator grill A produced by the method of the present invention comprises a rectangular frame B having a plurality of aligned pairs of axle holes C formed in a pair of longer sides of the frame at substantially equal intervals. Circular recesses D are formed in the outer surfaces of the longer sides of the grill frame B in coaxial relationship to the respective axle holes so that each of the axle holes C in each of the longer sides of the grill frame B is open to and communicated with the associated recess D. Louver vanes E are arranged in substantially parallel relationship with each other and pivotally mounted on the grill frame B. More specifically, each of the louver vanes E has axles F extending from the opposite ends of the vane. Disc-like friction portions G of a diameter greater than that of the axles F are integrally connected to the outer ends of the axles F. The axles rotatably extend through a pair of aligned axle holes C in the opposite longer sides of the grill frame B, while the disc-like friction portions G are received rotatably but frictionally in the recesses D. Thus, all of the louver vanes E are angularly movable or rotatable with respect to the grill frame B.

The inner or back sides of respective louver vanes E are linked together by a link rod H which is integral with thin-walled hinge or web sections I which in turn are integral with respective louver vanes, as will be best seen in FIG. 2. One of the louver vanes E is provided with a control knob J formed on the outer or front side of the vane, so that the louver vane having the control knob J formed thereon can be manipulated to control or adjust the angular orientation of all of the louver vanes E and thus to control the direction of air flow through the ventilator grill A.

Figure 3:
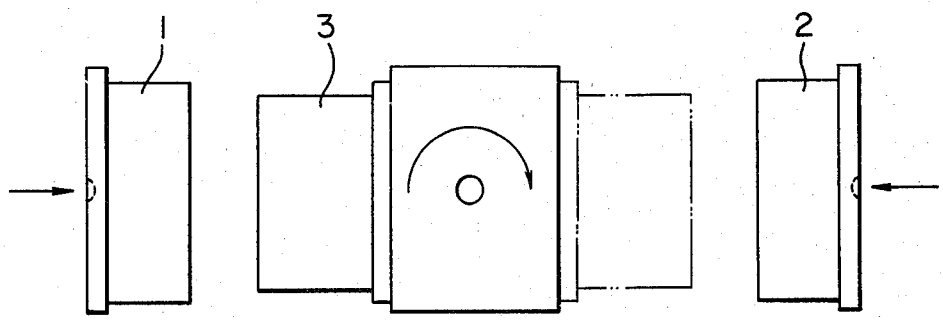
FIG. 3 is a schematic illustration of a moulding machine used to carry out the method of the invention.
Figure 5:
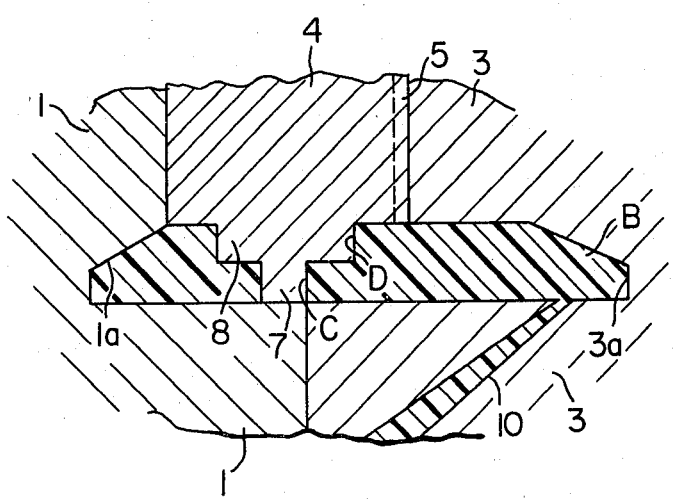
FIG. 5 shows in a further enlarged fragmentary view a part of the illustration in FIG. 4.

Then, the moulding machine used to produce the ventilator grill A will be described with reference to FIGS. 3–5. The moulding machine comprises a first mould half 1, a second mould half 3 and a third mould half 2. The second mould half 3 is disposed between the first and third mould halves 1 and 2 and supported for angular movement about an axis between a first position in which the second mould half is directed torward the first mould half 1 and a second position in which the second mould half 3 is directed toward the third mould half 2, as schematically shown in FIG. 3. For this reason, the second mould half 3 is called as "turn-over mould half." The first and third mould halves 1 and 2 are movable to and away from the first and second positions, respectively.

The surface of the first mould half 1 designed to cooperate with the second or turn-over mould half 3 is formed with a moulding recess 1a corresponding in shape to a part of the grill frame B. The surface of the third mould half 2 designed to cooperate with the second mould half 3 is also formed with a moulding recess 2a of a shape substantially identical to the shape of the moulding recess 1a formed in the first mould half 1. On the other hand, the surface of the second mould half 3 designed to cooperate with the first and third mould halves 1 and 2 is formed with a moulding recess 3a corresponding in shape to the rest of the grill frame B. Moreover, the second and third mould halves 3 and 2 are formed with moulding recesses 3b and 2b, respectively, for moulding the louver vanes E.

Slidable cores 4 are slidably mounted by means of dovetail grooves 5 on the second mould half 3 on the opposite sides of the grid frame moulding recess 3a. Each of the slide cores 4 has a forward or inner end on which are formed projections 7 and shoulders 8 corresponding in shape to an axle hole C and recess D formed in the grid frame B, as best seen in FIG. 5. Inclined pins 6 are secured to and extend from the surface of the first mould half in which the moulding recess 1a is formed. These inclined pins 6 are adapted to extend through inclined bores in the slidable cores 4 when the first and second mould halves 1 and 3 and the slidable cores 4 are gathered together in the first position, as shown in FIG. 4.

The second mould half 3 is provided with an inclined slidable core 13 for moulding the link rod H which interconnects the louver vanes E. The slidable core 13 is mounted on the second mould half 3 for slidable movement relative to the second mould half. The first mould half 1 is formed therein with a sprue 9, while the second mould half 3 is formed therein with runner gates 10 communicated with the moulding recess 3a and adapted to be communicated with the sprue 9 when the first mould half 1 is moved into close contacting relationship to the second mould half 3, as shown in FIG. 4. The third mould half 2 is formed therein with another sprue 11 which is communicated with the vane moulding recess 2b through a gate 12 which is also formed in the third mould half 2.

In operation, the second mould half 3 is first moved to the first position shown in FIG. 4. Then, the first mould half 1 is moved into close contacting relationship to the second mould half 3. The movement of the first mould half 1 causes the inclined pins 6 to move the slidable cores 4 inwardly toward each other to predetermined positions so that the moulding recesses 1a and 3a formed in the first and second mould halves 1 and 3 and the projections 7 and the shoulders 8 formed on the slidable cores 4 cooperate together to define a first moulding cavity for moulding the grill frame B. It will be noted that the projections 7 and the shoulders 8 on the slidable cores 4 define surfaces for moulding the axle holes C and the recesses D to be formed in the grill frame B.

Then, a plasticized plastics material such as ABS resin, for example, is injected by an injection cylinder (not shown) through the sprue 9 and the runner gates 10 into the grill frame moulding cavity to form a grill frame B, as shown in FIG. 4.

After the plastics material has been solidified in the mould cavity, the first mould half 1 is moved away from the second mould half 3 while the grill frame B thus formed is retained on the second mould half 3. The movement of the first mould half 1 away from the second mould half 3 causes the inclined pins 6 to move the slidable cores 4 outwardly away from the grill frame B thus formed. The movement of the first mould half is also effective to automatically sever or break the solidified plastics material in the runner gates 10. The beakage takes place adjacent the inner surfaces of the grill frame B.

Then, the second mould half 3 with the grill frame B retained thereon is angularly moved about an axis from the position shown in FIG. 4 through a position shown in FIG. 6 to a position shown in FIG. 7. The third mould half 2 is then moved into close contacting relationship to the second mould half 3 and to the part of the grill frame B projecting from the second mould half 3. It will be appreciated, therefore, that the grill frame B moulded in the mould formed by the cooperation of the first and second mould halves 1 and 3 and the slidable cores 4 has now been automatically inserted or placed in the mould formed by the cooperation of the second and third mould halves 3 and 2.

Now, the recesses 3b and 2b formed in the second and third mould halves 3 and 2 and the axle holes C and the recesses D formed in the grill frame B now placed in the recesses 3a and 2a cooperate to define a second mould cavity for moulding louver vanes E.

A second plasticized plastics material is then injected by a second injection cylinder (not shown) through the sprue 11 and the gate 12 into the second mould cavity. The second plastics material should be of the kind that is not weldable to the first plastics material and has a melting point lower than that of the first plastics material. An example of the second plastics material is polypropylene.

It will be noted that, when the second plastics material has been solidified in the second mould cavity, the second plastics material forms a louver section consisting of a plurality of louver vanes E having integral axles F and disc-like friction portions G and a link rod H which interconnects the vanes E. Since the axles F of the louver vanes E extend through the axle holes C in the grill frame and since the disc-like friction portions G are accomodated in the recesses D in the grill frame, the grill frame and the louver section form a ventilator grill A.

After the second plastics material has been solidified, the third mould half 2 is moved away from the second mould half 3 and from the ventilator grill thus formed. The movement of the third mould half 2 is effective to automatically sever the second plastics material at the gate 12. Thereafter, the slidable core 13 and conventional ejector pins (not shown) are moved rightwards as viewed in FIG. 7 to eject the ventilator grill from the second mould half 3. When the second plastics material is cooled, the material in the axle holes C in the grill frame B is shrunk radially inwardly from the inner surface of the axle holes to allow the vanes E to be rotated relative to the grill frame. However, the shrinkage also takes place in the axial direction of the axle holes C to inwardly pull the disc-like friction portions G into frictional engagement with the bottoms of the recesses D so that the disc-like friction portions G cooperate with the grill frame B to produce a slight or adequate frictional resistance to the rotational or angular movement of the vanes E relative to the grill frame B for thereby keeping the vanes E at any desired angular orientation.

It will be understood from the foregoing description that the method according to the present invention is greatly improved over the ventilator grill producing method disclosed in the specification of the Japanese Pat. No. 990,864 (Post-Examination Patent Publication No. 54-26,266) because the second mould half 3, which is a part of the mould for moulding the grill frame B, is used as means for automatically inserting or placing the thus formed grill frame B in the second mould for moulding the louver section of the ventilator grill A. Thus, the present invention assures an improved productivity, produces ventilator grills of high quality without using a moulding machine of complicated structure and, moreover, lowers the cost of manufacture.

The inclined pins 6 used in the described embodiment of the invention to move the slidable cores 4 for moulding the axle holes C and recesses D in the grill frame B may be replaced by any other conventional driving means, such as hydraulic cylinders. The link rod H has been described and illustrated as being integral with the louver vanes E, but may alternatively be prepared separately or independently of the louver vanes and operatively engaged therewith. In this alternative case, the second mould half 3 is not provided with the slidable core 13.

ABS resin and polypropylene resin have been pointed out as examples of the materials from which the grill frame B and the louver vanes E are made, respectively. The grill frame B, however, may alternatively be produced from other plastics materials such as high-impact polystyrene, polyacetal, polycarbonate, polyamide and polyphenylene oxide. The louver vanes may alternatively be produced from other plastics materials, such as polyethylene and ethylene vinyl acetate copolymer.

What is claimed is:

1. A method of producing a ventilator grill of the type which comprises a grill frame and substantially parallel louver vanes pivotally mounted on said grill frame, said grill frame including a pair of opposite sides in which aligned pairs of axle holes are formed, said louver vanes having axles extending from the opposite ends of said vanes respectively and rotatably received in respective aligned pairs of axle holes, said grill frame being provided with at least two recesses formed in the outer surfaces of said pair of opposite sides of said frame and communicated with one of said aligned pairs of axle holes, the louver vane associated with said one aligend pair of axle holes having disc-like friction portions integrally connected to the outer ends of the axles of said one vane and received in said recesses rotatably but frictionally to provide a slight frictional resistance to angular movements of said louver vane relative to said grill frame, said method comprising the steps of:

gathering together first and second mould halves and cores in a first predetermined position in which they cooperate to define a first mould cavity for moulding said grill frame, said cores defining surfaces for moulding said axle holes and said recesses;

injecting a first plastics material into said first mould cavity;

allowing said first plastics material to solidify in said first mould cavity to form said grill frame having axle holes and recesses;

removing said grill frame from said first mould half and from said cores while said grill frame is retained on said second mould half;

gathering together said second mould half with said grill frame thereon and a third mould half in a second predetermined position in which the part of said grill frame moulded by said first mould half is received in said third mould half and in which said second and third mould halves and said grill frame cooperate to define a second mould cavity for moulding said louver vanes, said second mould cavity including spaces for moulding said axles and friction portions, said spaces being defined by said axle holes and recesses formed in said grill frame;

injecting into said second mould cavity a second plastics material which is not weldable to said first plastics material and has a melting point lower than that of said first plastics material; and allowing said second plastics material to solidify in said second mould cavity to form said vanes, said axles and disk-like friction portions of said vanes being shrunk when solidified in said axle holes and recesses to allow said vanes to be angularly movable relative to said grill frame.

2. A ventilator grill producing method as claimed in claim 1, wherein said second mould half is supported for angular movement about an axis between said first and second predetermined positions and wherein, when said second mould half is placed in said first predetermined position, said first mould half and said cores are moved to said first predetermined position into close contacting relationship to said second mould half to cooperate therewith to define said first mould cavity and, when said second mould half with said grill frame thereon has been angularly moved to said second predetermined position, said third mould half is then moved to said second predetermined position into close contacting relationship to said second mould half and said grill frame thereon to cooperate with them to define said second mould cavity.

* * * * *